United States Patent Office 3,487,688
Patented Jan. 6, 1970

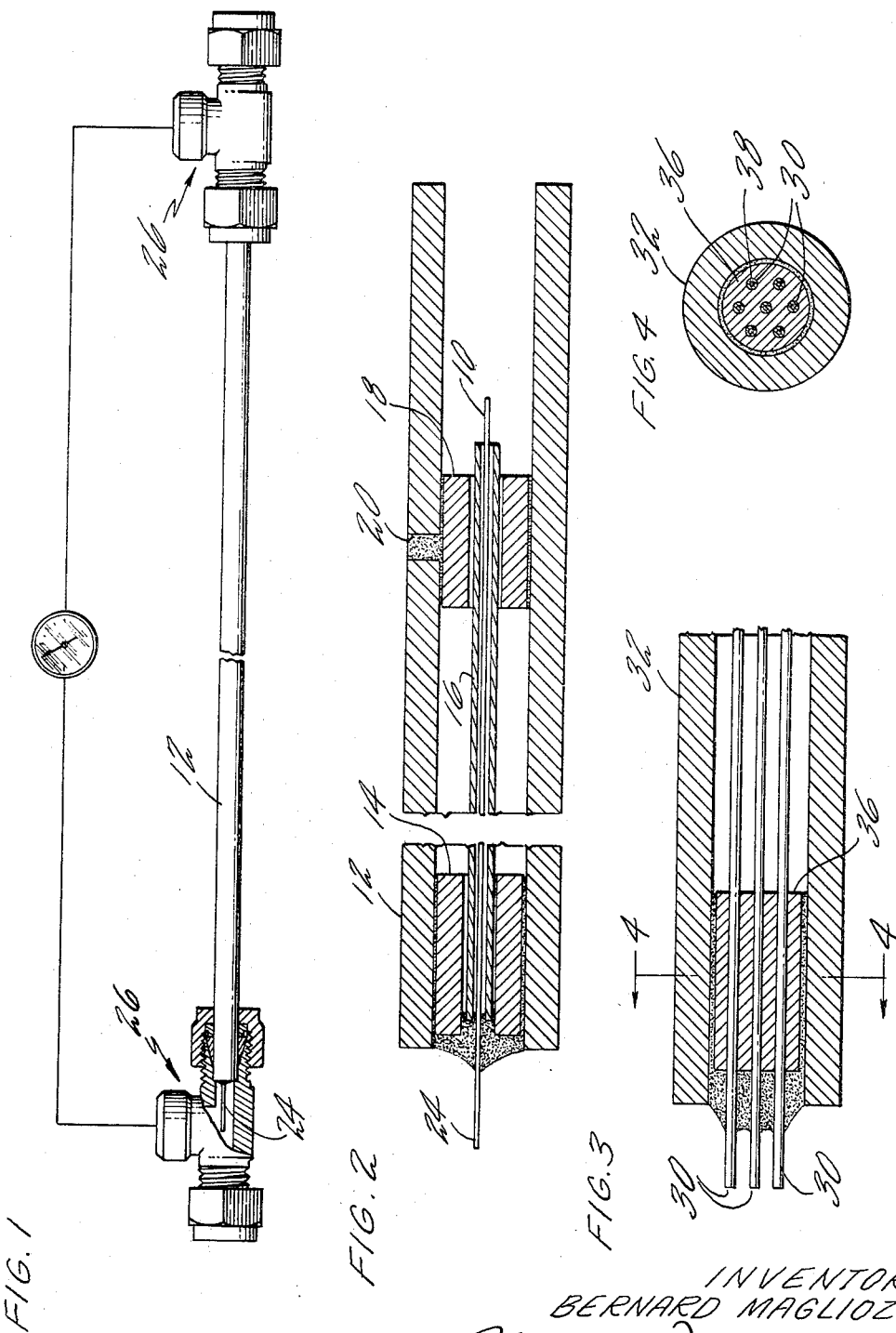

3,487,688
LAMINAR VOLUME FLOW METER AND CONSTRUCTION THEREOF
Bernard Magliozzi, Warehouse Point, Conn., assignor to United Aircraft Corporation, East Hartford, Conn., a corporation of Delaware
Filed Apr. 17, 1967, Ser. No. 631,400
Int. Cl. G01f 1/00
U.S. Cl. 73—211             5 Claims

ABSTRACT OF THE DISCLOSURE

A volume flow meter is constructed with a capillary tube mounted in an elongated hollow member and joined concentrically thereto by a soldered spacer where one end of the capillary tube projects beyond the end of the hollow member and the other end of the capillary tube terminates short of the end of the hollow member. Standard fittings are mounted at the ends of the hollow member where one fitting receives the projected end of the capillary tube. Calibration of the flow meter is attained by cutting and smoothing off the end of the projections.

Background of the invention

This invention relates to laminar flow meters and particularly to laminar flow meters metering very low gas flow rates by utilizing capillary tubes. The invention described herein was made in the performance of work under a NASA contract and is subject to the provisions of Section 305 of the National Aeronautics and Space Act of 1958, Public Law 85–568 (72 Stat. 435; 42 U.S.C. 2457).

Since the advent of space exploration and space flight, the need for measuring extremely low flow rates has been particularly emphasized. Not only is accuracy of prime importance but also the flow meter must operate over extremely wide ranges and must do so in pressures that vary from 3 pounds per square inch absolute to 3000 pounds per square inch gauge. Heretofore one of the customary means of detecting leakages where low flows are involved is by use of a mass spectrometer. Not only is this an expensive device for detecting low flows but its accuracy is in the range of 25%. The mass spectrometer by itself is however not a flow meter but is a device which detects leakages. It does not lend itself to be utilized as a flow meter as such.

Another customary method of measuring low flows is the use of a variable area flow meter. The variable area flow meter not only leaves something to be desired by way of accuracy, it does not operate over a wide range and is not capable of operating where large pressures are involved.

Notwithstanding the existence of these two well-known devices, a void has persisted in the art inasmuch as a mass spectrometer is used for very low low ranges and the variable area flow meter is used at a relatively higher flow range and a gap existed between these two ranges. This device not only fills this gap but has capabilities in both the ranges of where the mass spectrometer and variable area flow meters are used. I have found that I can obviate the problems noted above by providing a capillary tube concentrically mounted in an outside tube and sealed on one end wherein a portion of the capillary tube projects beyond the end of the outside tube and the other end is within the outside tube. The section of the capillary tube that protrudes can be cut in order to develop precise calibration without affecting the dimensions of the outer cover, thus leaving all exterior dimensions unchanged. In addition the outside tubes can be any standard size tubing which can accommodate standard size fittings.

Summary of invention

A primary object of this invention is to provide an improved laminar flow meter.

A still further object of this invention is to provide a laminar flow meter comprising an elongated cylindrical cover in which is mounted a capillary tube having one end projecting beyond the end of the cover and adapted for precise calibration.

A still further object of this invention is to provide a laminar flow meter utilizing standard fittings and tubes in combination with capillary tubes mounted in parallel therein.

A still further object of this invention is to provide a laminar flow meter affording the following advantages: (1) the relationship between flow and pressure drop is linear, (2) standard fittings are utilized allowing simple installation procedure and quick interchangeability without the need to rework the plumbing, (3) construction is compatible with systems for high and low pressure gases, (4) capillary size and length can be adjusted for precise pressure drop over flow constants, (5) the flow meter is relatively insensitive to fluid density, (6) its useful range is better than 100 to 1 as compared to a range of 12 to 1 for a variable area flow meter, (7) it is insensitive to sharp vibrations and orientations, and (8) no moving parts are required and it is therefore extremely repeatable.

Other features and advantages will be apparent from the specification and claims and from the accompanying drawings which illustrate an embodiment of the invention.

Brief description of the drawings

FIGURE 1 is a view partly in section, partly in elevation and partly in schematic illustrating the metering element and gauge;

FIGURE 2 is a sectional view showing the details of the invention;

FIGURE 3 is a sectional view showing another embodiment of this invention wherein a plurality of parallelly spaced capillary tubes are utilized; and FIGURE 4 is a sectional view taken along line 3—3 of FIG. 2.

Description of the preferred embodiment

Reference is now made to FIGS. 1 and 2 which shows a preferred embodiment of the laminar flow meter as comprising a capillary tube 10 concentrically mounted in a standard tube 12. The length of tube 12 is adapted to be sized according to the predetermined end use, noting that it is longer in length than the capillary tube 10. Capillary tube 10 is held in position by spacer 14 which is suitably soldered thereto such that the solder serves to act as a seal. The material of the tube in the preferred embodiment is stainless steel and the solder is silver solder. However, it will be noted than any suitable material may be utilized but preferably material that is corrosive resistant and susceptible of sustaining high pressures. If necessary, an inner tube 16 may be adapted to surround the capillary tube 10 if additional support is necessary. A second spacer 18 is inserted near the proximity of the other end of capillary tube 12 and is soldered thereto through an opening 20 formed in the tube 12.

In construction of the unit, spacer 18 is inserted and soldered into place. The capillary tube 10 is then inserted, then spacer 14. The capillary tube 10 and the spacer 14 are then soldered into place, the solder forming a leak-tight seal at the end.

As the inside bore of a capillary tube is not uniform and its tolerance can vary a great deal, the length of the tube can be easily accommodated in this construction since there is sufficient distance between the end of tube 12 and the end of capillary tube 10 to lengthen the capillary to compensate for diameter errors. Once the desired length and size of the capillary tube is obtained it is then calibrated by a standard calibration unit whereupon slight adjustments of the length of the tube are obtained by snipping off the projecting end 24 of capillary tube 10.

From the foregoing it is apparent that the outside dimensions of the unit need not be altered so that it can be readily adapted to a given sized application. Either end of the capillary tube is adapted to receive swage fitting generally illustrated by numeral 26. A suitable swage fitting may be the Swagelok Union T manufactured by the Crawford Fitting Company.

The unit described above is particularly efficacious where flow ranges of 2 cc. per hour to 100 cc. per hour are desirable. Where the flow is at a higher rate, say, at 3000 cc. per hour, the unit can be constructed as illustrated in FIG. 3 which shows a plurality of parallelly placed capillary tubes generally indicated by numeral 30 mounted in cover 32. Spacers 34 and 36 are adapted to support these tubes concentrically to cover 32. Likewise as was shown in FIG. 2 the end of the tube is sealed by soldering and the spacer 36 is held in place thereby. As shown in FIG. 4 the spacer 36 comprises a plurality of openings 38 adapted to receive and hold in predetermined relation the parallelly spaced capillary tubes 30. The ends of the capillaries project beyond the end of the cover and are readily adapted to be shortened for calibration purposes.

It should be understood that the invention is not limited to the particular embodiments shown and described herein, but that various changes and modifications may be made without departing from the spirit or scope of this novel concept as defined by the following claims.

I claim:
1. A laminar flow meter element comprising:
   an elongated hollow member,
   a capillary tube having a uniform cross section throughout its length concentrically mounted in said hollow member,
   one end of said capillary tube terminating within said hollow member,
   means for simultaneously bonding said capillary tube to said hollow member and sealing of the end of said hollow member,
   means for permitting calibration of said capillary tube external of said hollow member,
   said means including a portion of said capillary tube projecting beyond said hollow member so as to permit shortening of said capillary tube to obtain a predetermined flow for a given pressure drop across said capillary tube.
2. A laminar flow meter element as claimed in claim 1 including fittings adapted to accommodate conduits secured at the ends of said hollow member.
3. A laminar flow meter element as claimed in claim 1 including a bushing having a central opening interposed between the capillary tube and hollow member at the end of the hollow member where the capillary tube is bonded.
4. The method for constructing and calibrating a laminar flow meter element comprising the steps of:
   bonding a spacer to a hollow elongated member at a point intermediate the ends thereof,
   bonding a pre-sized capillary tube within said hollow member such that one end of the capillary projects beyond the end of the hollow tube and the other end is supported by the spacer and that the end of the hollow member adjacent the projection is sealed,
   fastening seal-tight fittings at both ends of the hollow member,
   measuring the amount of fluid passing through said capillary for a given period of time, and
   shortening the length of said capillary by cuttting the end of the projection to a size predicated on the volume flow desired by said meter.
5. A laminar flow meter element comprising:
   an elongated hollow member,
   a capillary tube concentrically mounted in said hollow member,
   at least one of the ends of said capillary tube projecting beyond the end of said hollow member and being dimensioned so that the capillary tube can be shortened so as to obtain a predetermined flow passing through said capillary tube for a given pressure drop,
   means simultaneously bonding said capillary tube to said hollow member and sealing of the end of said hollow member adjacent said projecting end of said capillary tube,
   said projection end being excessible externally of said hollow member for permitting calibration of said capillary tube.

References Cited

UNITED STATES PATENTS

| 1,487,989 | 3/1924 | Vose | 73—205 |
| 1,630,318 | 5/1927 | Tate | 73—211 X |
| 2,879,140 | 3/1959 | Karasek et al. | 73—205 X |
| 3,071,001 | 1/1963 | Goldsmith | 73—211 |
| 3,349,619 | 10/1967 | Millar | 73—205 |

FOREIGN PATENTS 546,145 6/1942 Great Britain.

RICHARD C. QUEISSER, Primary Examiner
J. K. LUNSFORD, Assistant Examiner

U.S. Cl. X.R.
73—205